United States Patent
O'Boyle

[11] Patent Number: 5,727,617
[45] Date of Patent: Mar. 17, 1998

[54] PLATE STABILIZER ASSEMBLY FOR ROTARY REGENERATIVE AIR PREHEATERS

[75] Inventor: Kevin J. O'Boyle, Wellsville, N.Y.

[73] Assignee: ABB Air Preheater, Inc., Wellsville, N.Y.

[21] Appl. No.: 777,292

[22] Filed: Dec. 27, 1996

[51] Int. Cl.⁶ .................................. F23L 15/02
[52] U.S. Cl. ..................... 165/9; 165/10; 165/8; 165/DIG. 20
[58] Field of Search ............... 165/10, 9, 8, 6, 165/DIG. 20, DIG. 21, DIG. 22

[56] References Cited

U.S. PATENT DOCUMENTS

| | | | |
|---|---|---|---|
| 2,874,939 | 2/1959 | Rahr et al. | 165/9 |
| 3,786,868 | 1/1974 | Finnemore | 165/9 |
| 4,024,907 | 5/1977 | Brzytwa | 165/9 |
| 4,122,891 | 10/1978 | Baker | 165/9 |
| 4,149,587 | 4/1979 | Stockman | 165/9 |
| 4,284,125 | 8/1981 | Stockman | 165/9 |
| 4,298,055 | 11/1981 | Ritter | 165/9 |
| 5,628,360 | 5/1997 | Brophy et al. | 165/9 |

*Primary Examiner*—Denise L. Ferensic
*Assistant Examiner*—Christopher Atkinson
*Attorney, Agent, or Firm*—Alix, Yale & Ristas, LLP

[57] ABSTRACT

An arrangement is provided in an air preheater for mounting and adjusting the sector plates and the axial seal plates in relation to the rotor using one adjustable mounting means and a stabilizer assembly. The stabilizer assembly includes a stabilizer beam which is fixedly mounted to the external preheater structure, a pair of stabilizer lugs having one end fixedly mounted to the stabilizer beam, a pair of stabilizer arms each having a first end rotatably mounted to the other end of the stabilizer lugs by a torsion bar which extends between the stabilizer lugs, and a pinned linkage mechanism which rotatably mounts the second end of each stabilizer arm to the sector plate or axial plate.

18 Claims, 7 Drawing Sheets

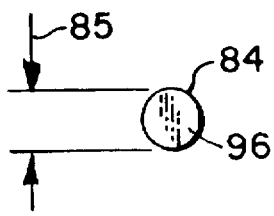
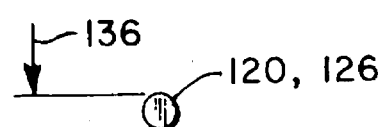
FIG. 12     FIG. 13
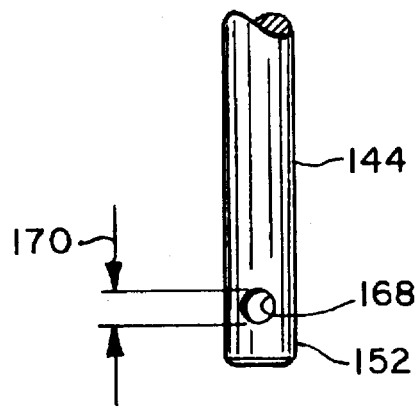
FIG. 14     FIG. 15
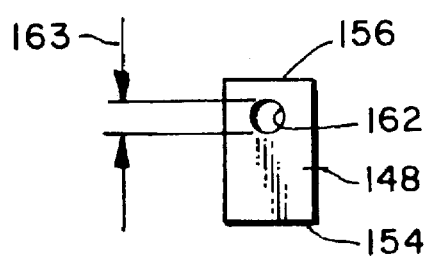
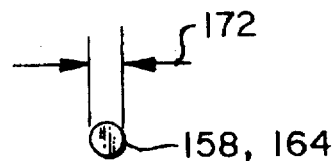
FIG. 16     FIG. 17

5,727,617

PLATE STABILIZER ASSEMBLY FOR ROTARY REGENERATIVE AIR PREHEATERS

BACKGROUND OF THE INVENTION

The present invention relates to rotary regenerative air preheaters which employ axial seals and axial seal plates located between the rotor and the rotor housing and sector plates dividing the air preheater into a gas sector and one or more air sectors. Specifically, the invention relates to a novel arrangement for stabilizing the axial seal plates and sector plates.

A rotary regenerative air preheater transfers sensible heat from the flue gas leaving a boiler to the entering combustion air through regenerative heat transfer surface in a rotor which turns continuously through the gas and air streams. The rotor which is packed with the heat transfer surface is supported through a lower bearing at the cold end of the air preheater and guided through a bearing assembly located at the top hot end. The rotor is divided into compartments by a number of radially extending plates referred to as diaphragms. These compartments are adapted to hold baskets in which the heat transfer surface is contained. The air preheater is divided into a flue gas side or sector and one or more combustion air sides or sectors by sector plates. Flexible radial seals on the rotor, usually mounted on the top and bottom edges of the diaphragms, are in close proximity to these sector plates and minimize leakage of gas and air between sectors. Likewise, axial seal plates are mounted on the housing between the housing and the periphery of the rotor between the air and gas sectors. These axial seal plates cooperate with flexible axial seals mounted on the outer ends of the diaphragms. These axial seals and seal plates together with the radial seals and sector plates effectively separate the air and flue gas streams from each other.

The seal plates and sector plates are subject to traveling pressure loads due to rotation of the rotor. This loading condition will cause the plates to tip or rotate if they are not restrained by at least three supports. Each such support, known as adjusters/actuators, typically required a mounting box or canister, several grade plates, a threaded and machined adjuster rod, shear bolt means to tie the adjuster rod to the axial seal plate plus an assortment of nuts and bolts. Such adjusters/actuators are expensive to produce and difficult to install or replace.

SUMMARY OF THE INVENTION

The present invention provides an arrangement of means in an air preheater for mounting and stabilizing axial seal plates and sector plates by attaching such plates to a pair of stabilizer arms via pinned connections. The stabilizer arms are joined by a torsion bar which also acts as a pin to join the stabilizer arms to a stabilizer lug which is mounted to the heat exchange structure via a stabilizer beam. Such a stabilizer assembly utilizes a reduced number of mountings, thereby reducing cost and facilitating installation.

BRIEF DESCRIPTION OF THE DRAWINGS

FIG. 12 is an enlarged end view of the torsion bar of FIG. 5.

FIG. 13 is an enlarged end view of the stabilizer assembly linkage pins of FIG. 5.

FIG. 14 is an enlarged view of the adjuster/actuator rod taken along line A—A of FIG. 6.

FIG. 15 is an enlarged view of the adjuster/actuator linkage plates taken along line A—A of FIG. 6.

FIG. 16 is an enlarged view of the adjuster/actuator mounting lug taken along line A—A of FIG. 6.

FIG. 17 is an enlarged view of the adjuster/actuator linkage pins taken along line A—A of FIG. 6.

DESCRIPTION OF THE PREFERRED EMBODIMENTS

Figure 1:
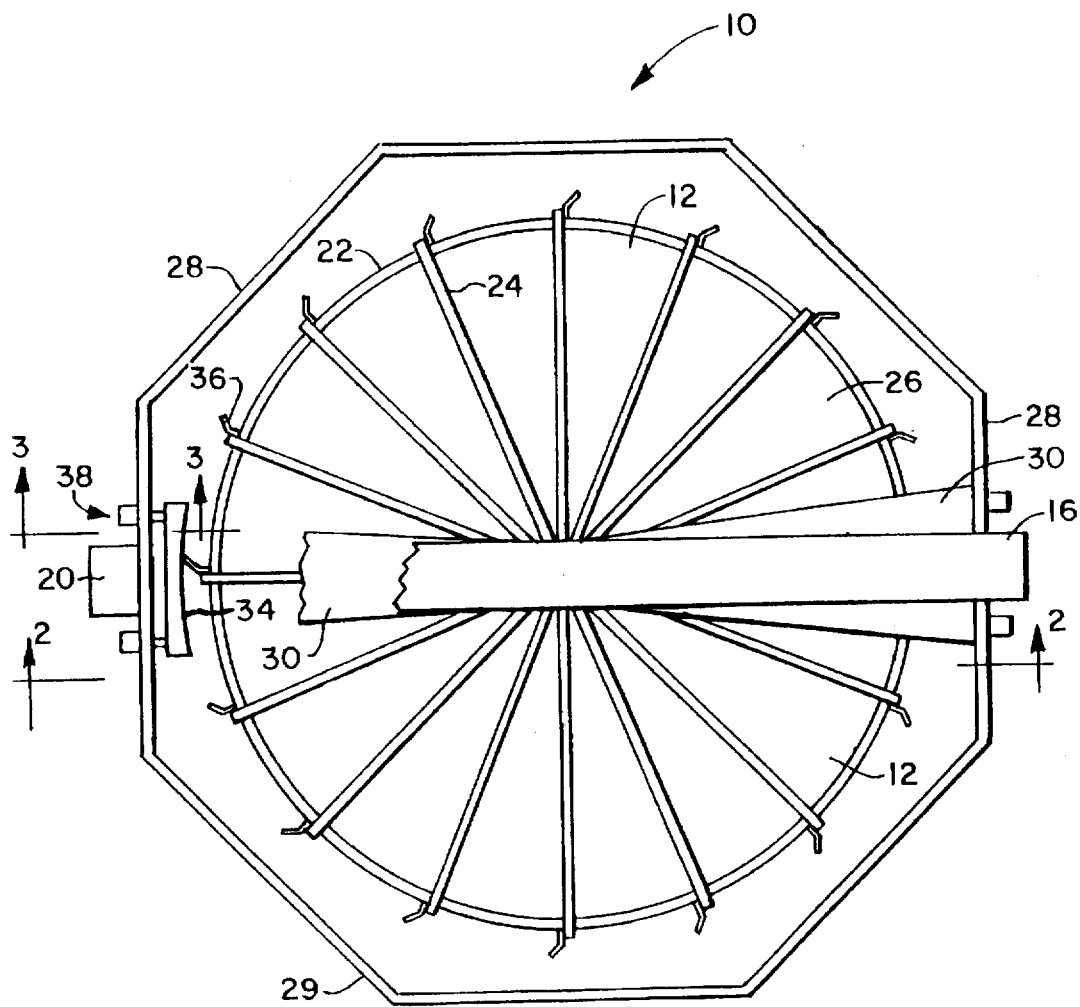
FIG. 1 is a top plan view of a typical rotary regenerative air preheater with the upper hot end center section and sector plate partially broken away for clarity and illustrating the axial seal plates mounted in position.
Figure 2:
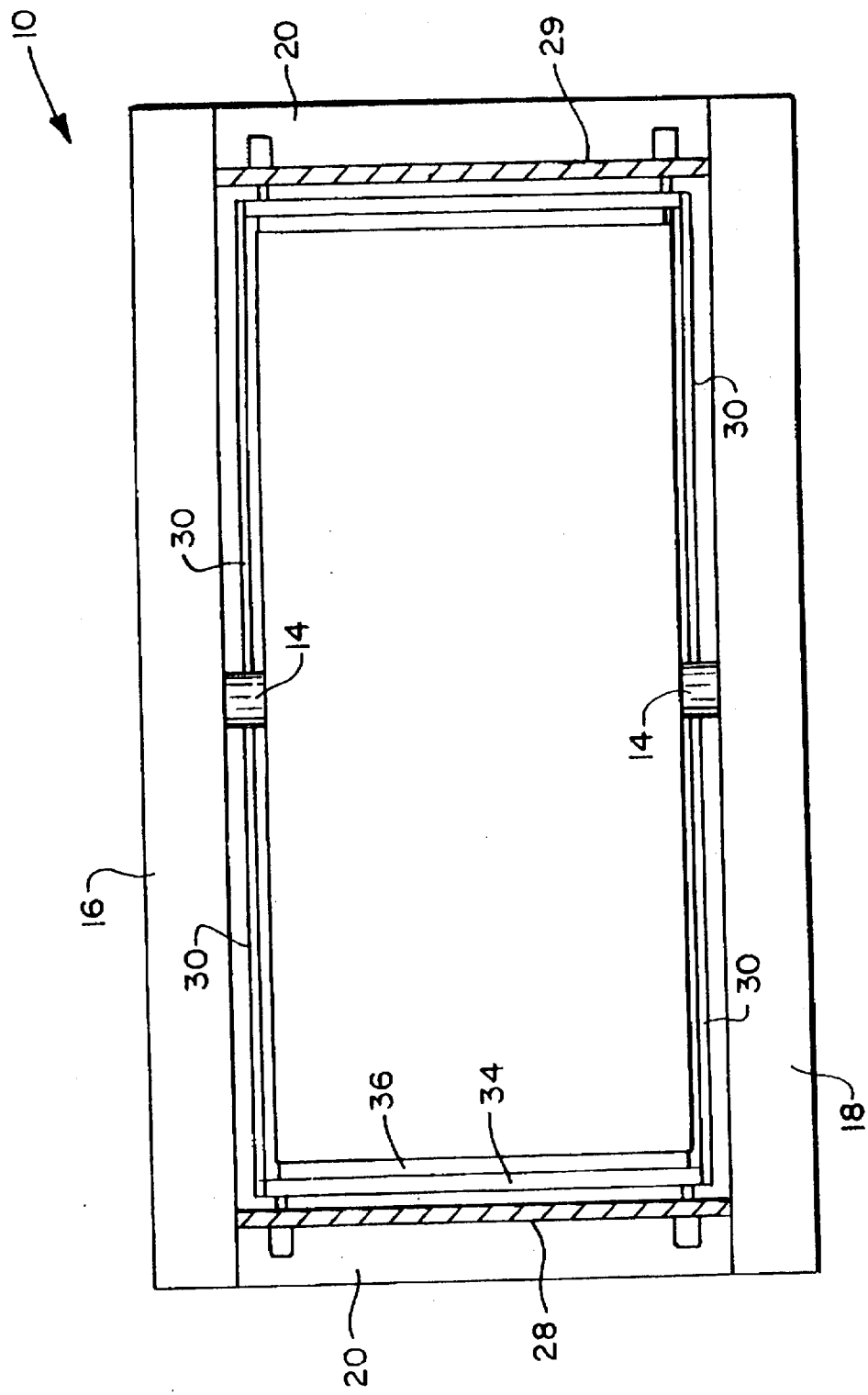
FIG. 2 is an elevation view in cross section of the air preheater of FIG. 1.

In order to understand and appreciate the present invention, reference will first be made to FIGS. 1 to 5 which illustrate the general environment of the invention and the prior means for mounting the axial seal plates of an air preheater. FIGS. 1 and 2 depict a top plan view and a vertical cross-section view respectively of an air preheater 10. The rotor 12 is mounted on the shaft 14 and supported between the hot end center section 16 and the cold end center section 18. The hot end center section 16 is supported from the cold end center section 18 by the pedestals 20 on each end of these center sections 16 and 18. The rotor 12 comprises an outer rotor shell 22 and diaphragms plates 24 dividing the rotor into a plurality of compartments 26. As is conventional, heat exchange baskets would be loaded into the compartments 26.

Figure 4:
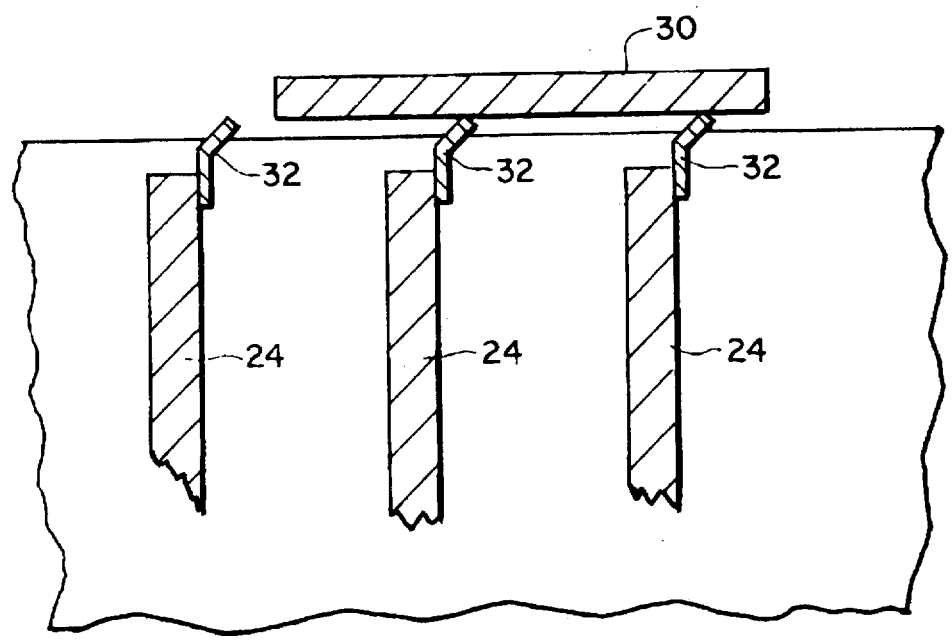
FIG. 4 is a section view of a portion of the rotor and sector plate illustrating a seal arrangement.

Mounted on the top and bottom of the structure and usually attached to the sides of the center sections would be the conventional flue gas and air inlet and outlet connecting plate duct assemblies (not shown) which form the connection and transition between the rectangular ducts and the circular air preheater. Mounted between the hot and cold end center sections 16, 18 and around the rotor 12 are the vertical housing panels 28 which form a part of the external rotor housing 29 which may be considered to include the previously mentioned hot and cold end center sections as well as other structural members not shown. Mounted adjacent to the upper and lower ends of the rotor 12 are the conventional sector plates 30 which divide the air preheater 10 into a flue gas side or sector and an air side or sector in a known manner. As shown in FIG. 4, radial seals 32 which are normally attached to the upper and lower edges of the diaphragm plates 24 interact with the sector plates 30 to prevent or reduce the intermixing of the air and flue gas. Also, circumferential bypass seals (not shown) would be provided between the rotor 12 and the housing 29 to prevent the air and flue gas from flowing around the outside of the rotor 12. These are usually located around both the bottom and top edges of the rotor 12.

FIGS. 1 and 2 also show the axial sealing means extending in the axial direction at the periphery of the rotor between the gas side and air side. This sealing means comprises the axial seal plates 34 and the axial seals 36. The axial seal plates 34 are mounted from the vertical housing panels 28 and adjustably positioned in the proximity of the rotor periphery. Mounted on the rotor 12 and usually on the outer ends of the diaphragm plates 24 are the flexible axial seals 36. These flexible axial seals 36 are in close proximity to the axial seal plates 34 thereby minimizing the amount of fuel gas and air from flowing circumferentially into the wrong sector.

Figure 3:
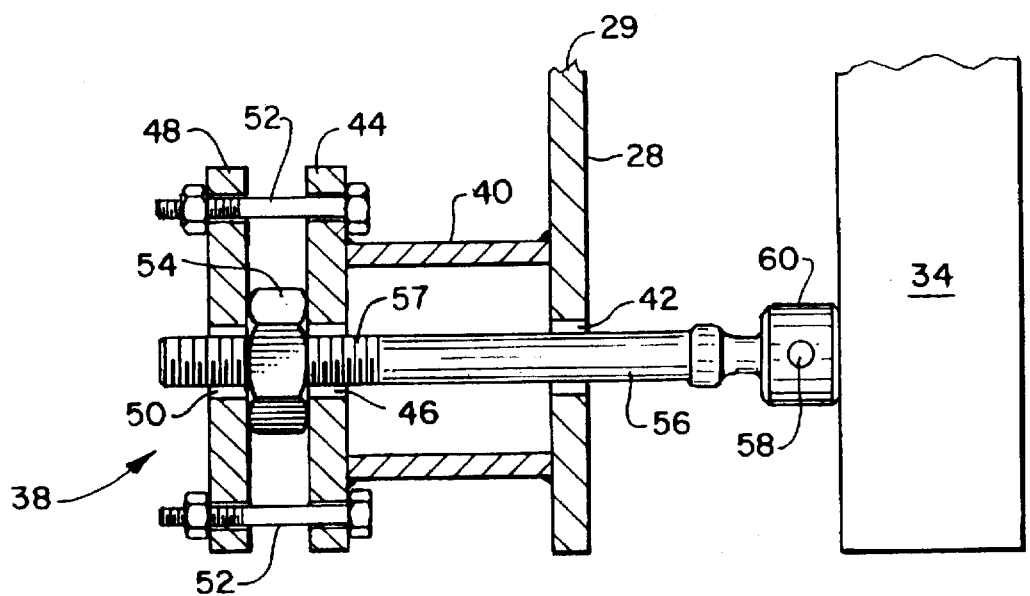
FIG. 3 is a section view taken along line 3—3 of FIG. 1 illustrating the details of one of the prior art canister-type adjustable mountings.

The present invention relates to the mounting of the axial seal plates 34 and the sector plates 30 from portions of the housing or external preheater structure 29. FIG. 3 illustrates a typical prior art method of mounting the seal plates 34 and the same arrangement has been used to mount the sector plates 30. The prior art adjustable mounting means 38, which is commonly referred to as a canister-type adjuster, comprises a canister 40 which is basically a box welded to a vertical housing panel 28 around an aperture 42. Welded to the outer end of the canister 40 is a guide plate 44 having an aperture 46. Located outwardly of the guide plate 44 is a second guide plate 48 having an aperture 50 which is bolted to the first guide plate 44 by the bolts 52. Clamped between the two guide plates 44, 48 is a hex nut 54 which can be turned when the bolts 52 are loosened and which is held tightly in position when the bolts 52 are tightened. Threaded through the hex nut 54 and attached to the axial seal plate 34 is an adjuster rod 56. This rod 56 is threaded at 57 such that the rod 56 will move axially with respect to the panel 28 and with respect to the rotor 12. The rod 56 is attached to the axial seal plate 34 by means of a sheer pin 58. In the illustrated arrangement, the fitting 60 on the end of the rod 56 is attached to a post (not shown) extending from the axial seal plate 34 by the sheer pin 58 extending through holes in the post and fitting 60 although other specific arrangements can be used. Therefore, turning the hex nut 54 moves the axial seal plate 34 either toward or away from the rotor 12. There are canister-type adjusters 38 in at least each of the four corners of each of the axial seal plates 34.

Figure 5:
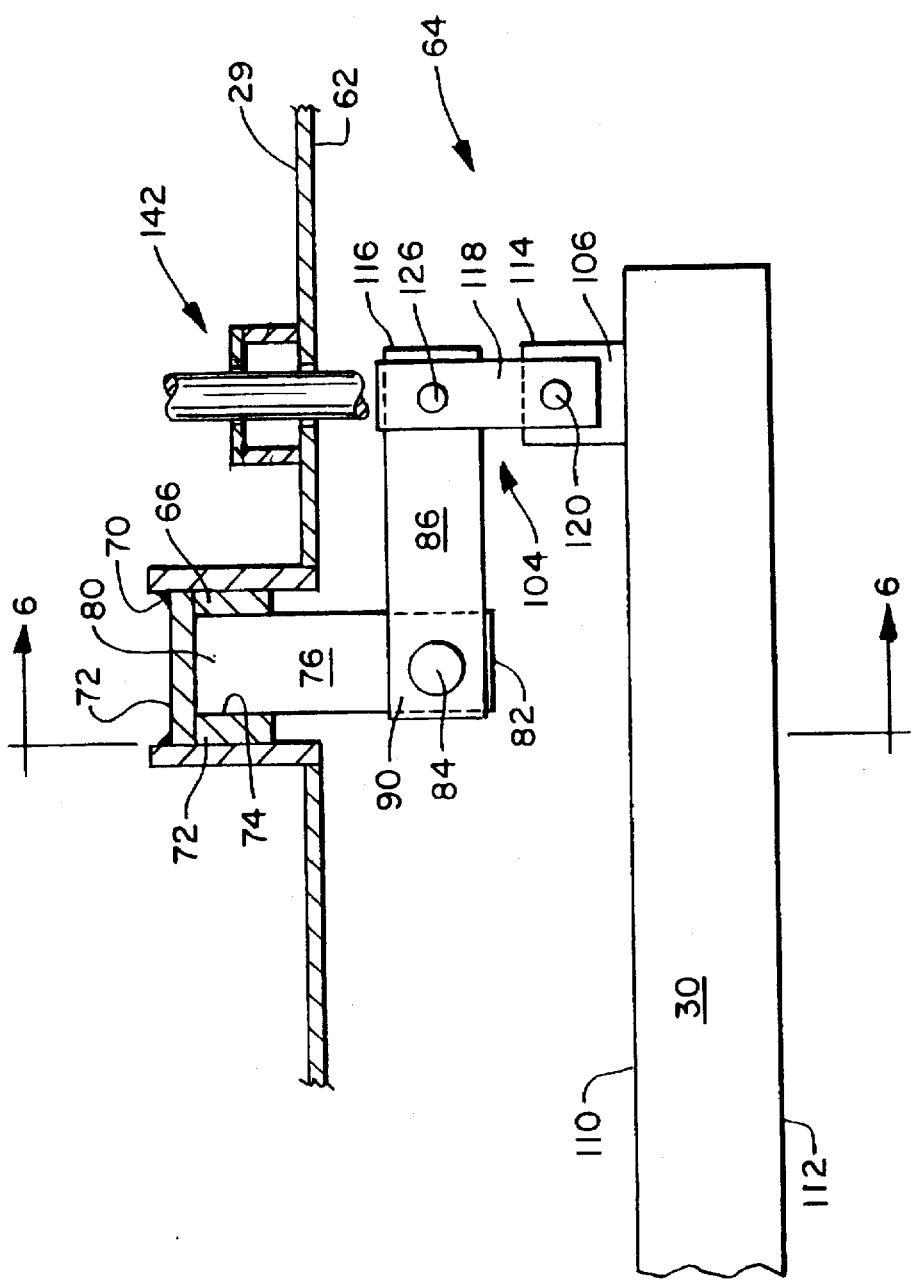
FIG. 5 is a section view of a portion of an air preheater showing a sector plate and a stabilizer assembly in accordance with the present invention.
Figure 6:
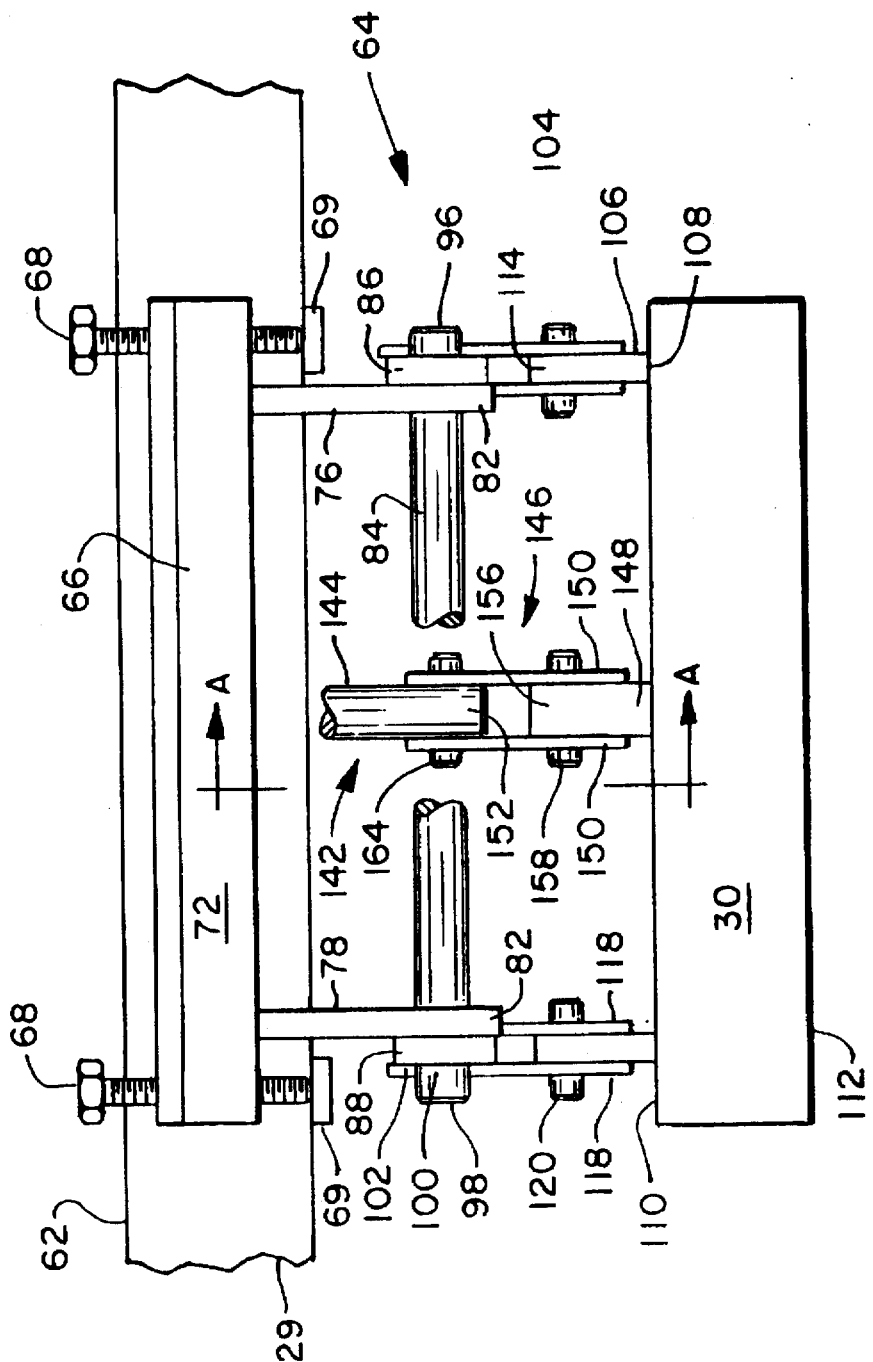
FIG. 6 is a section view of the sector plate and the stabilizer assembly taken along line 6—6 of FIG. 5.

FIGS. 5 and 6 illustrate a sector plate 30 which is mounted to a portion 62 of the external preheater structure 29 by a stabilizer assembly 64 in accordance with the invention. This portion 62 of the external rotor housing could correspond to the hot end center section 16 or to any other desired structural member. It should be appreciated that such a stabilizer assembly 64 may also be used to mount a seal plate 34 to another portion of the external preheater structure 29, such as a vertical housing panel 28. The stabilizer assembly 64 includes a stabilizer beam 66 which is mounted to the external preheater structure 29. During initial installation, the stabilizer beam 66 is leveled with a pair of leveling bolts 68 which bear against a bearing member such as shown at 69. Once the stabilizer beam 66 has been leveled, it is fixedly mounted in place, for example by welds 70. Preferably, the stabilizer beam 66 comprises three side walls 72 defining a trough 74.

Figure 8:
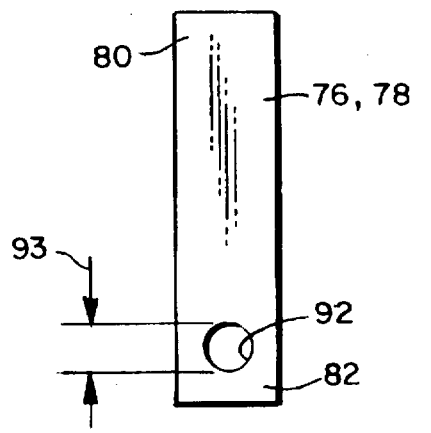
FIG. 8 is an enlarged side view of the stabilizer lug of FIG. 5.
Figure 9:
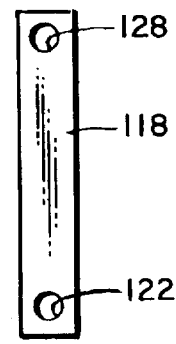
FIG. 9 is an enlarged side view of the stabilizer assembly linkage plates of FIG. 5.
Figure 10:
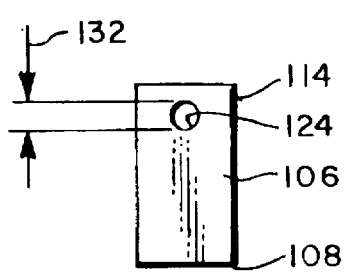
FIG. 10 is an enlarged side view of the stabilizer assembly mounting lug of FIG. 5.
Figure 11:
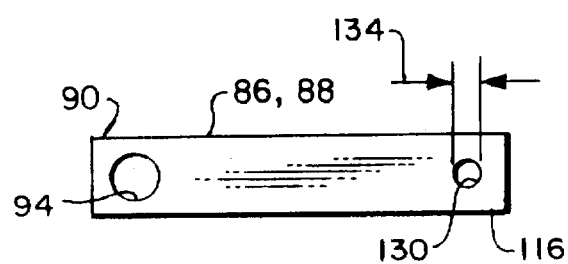
FIG. 11 is an enlarged side view of the stabilizer arm of FIG. 5.

With further reference to FIGS. 8, 11 and 12, the stabilizer assembly 64 further comprises first and second stabilizer lugs 76, 78. Each stabilizer lug 76, 78 has a first end portion 80 which is received in the trough 74 adjacent one of the ends of the stabilizer beam 66. The first end portion 80 of each stabilizer lug 76, 78 is fixedly mounted within the stabilizer beam 66, wherein each stabilizer lug 76, 78 extends substantially orthogonally from the trough 74. A torsion bar 84 mounts first and second stabilizer arms 86, 88 to the second end portions 82 of the first and second stabilizer lugs 76, 78, wherein the stabilizer lugs 76, 78 are disposed between the stabilizer arms 86, 88.

The second end portion 82 of each stabilizer lug 76, 78 and the first end portion 90 of each stabilizer arm 86, 88 include an opening 92, 94 shown in FIGS. 8 and 11. The torsion bar 84 is received in the openings 92, 94 wherein the torsion bar 84 pins the stabilizer arms 86, 88 to the stabilizer lugs 76, 78.

The diameter 93 of the openings 92 in the second end portion 82 of the stabilizer lugs 76, 78 and the diameter 85 of the torsion bar 84 are selected such that the torsion bar 84 is free to rotate within the openings 92. Preferably, the first and second ends 96, 98 of the torsion bar 84 are welded at 100 to the first and second stabilizer arms 86, 88 to fixedly mount the stabilizer arms 86, 88 to the torsion bar 84. In one embodiment, the ends 96, 98 of the torsion bar 84 extend beyond the surface 102 of the stabilizer arms 86, 88 to facilitate forming the weld 100.

With reference to FIGS. 5, 6, 9, 10 and 13, a pinned linkage mechanism 104 is used to mount the sector plate 30 to each stabilizer arm 86, 88, wherein the sector plate 30 is offset from the stabilizer arms 86, 88. Each linkage mechanism 104 comprises a mounting lug 106 which has a first end 108 mounted to the surface 110 of the sector plate 30 which is opposite the sealing surface 112. The mounting lug 106 extends substantially orthogonally from the surface 110 to a distal end portion 114 wherein the distal end portion 114 is adjacent the second end portion 116 of a stabilizer arm 86, 88. A pair of linkage plates 118 are disposed on either side of the second end portion 116 of the stabilizer arm 86, 88 and the distal end portion 114 of the mounting lug 106. The distal end portion 114 of the mounting lug 106 is pinned to the linkage plates 118 by a first linkage pin 120 which extends through a first opening 122 in each linkage plate 118 and an opening 124 in the distal end portion 114 of the mounting lug 106. The second end portion 116 of the stabilizer arm 86, 88 is pinned to the linkage plates 118 by second linkage pin 126 which extends through a second opening 128 in each linkage plate 118 and an opening 130 in the second end portion 116 of the stabilizer arm 86, 88. The diameter 132 of the openings 124 in the distal end portion 114 of each mounting lug 106, the diameter 134 of the opening 130 in the second end portion 116 of each stabilizer arm 86, 88, and the diameter 136 of the first and second linkage pins 120, 126 are selected such that the linkage pins 120, 126 are free to rotate within the openings 124, 130. The first and second openings 122, 128 in the linkage plates 118 may be sized to frictionally engage the linkage pins 120, 126. Alternatively, the linkage plates 118 may be mounted to the linkage pins 120, 126 by welds or pins.

Figure 7:
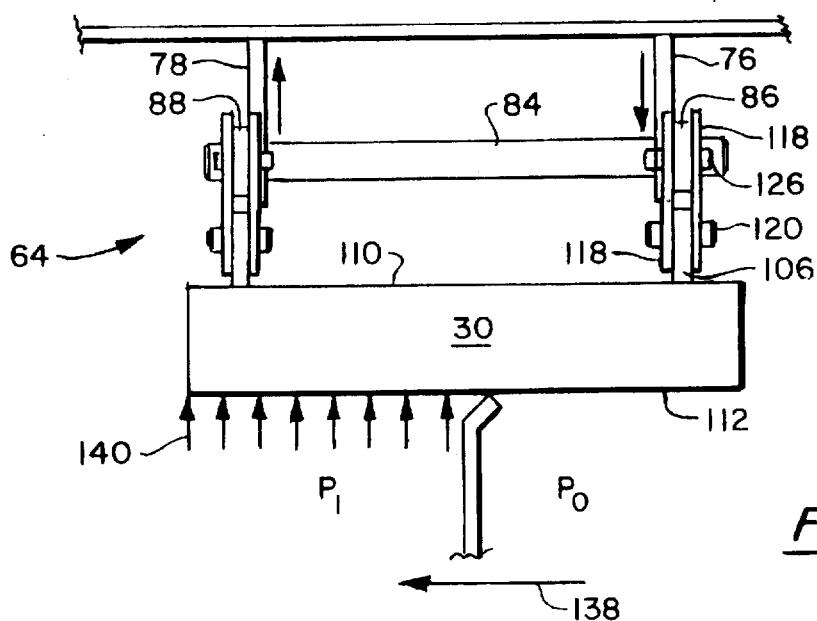
FIG. 7 is a section view of a portion of the air preheater of FIG. 5 showing the rotor, the sector plate and the stabilizer assembly and illustrating the pressure environment.

As shown in FIG. 7, rotation of the rotor within the air preheater subjects the sector plates 30 to traveling pressure loads. This same traveling pressure is also applied to the axial seal plates 34. As the rotor rotates, each sector is alternately exposed to either the flue gas pressure or the combustion air pressure. Generally the air pressure is from one to three (1–3) psig and the flue gas pressure is zero (0) psig or slightly negative. Therefore, the force exerted on the sector plates 30 as well as the axial seal plates is not uniform across the plates. As the rotor rotates in the direction shown by the arrow 138, the area which is subject to pressure force $P_0$ becomes larger as the area which is subject to the pressure force $P_1$ becomes smaller. Since $P_0$ and $P_1$ are not equal, the force exerted by the two pressures are not equal. The torsion bar 84 counteracts the tipping force illustrated by the arrows 140 which is induced by this loading condition.

With reference to FIG. 6, a single adjuster/actuator assembly 142 is used to adjust the location of the sector plate 30. The same type of assembly would be used to adjust the seal plate location. The adjuster/actuator assembly 142 comprises an actuator/adjuster rod 144 which is mounted to the surface 110 of the sector plate 30 by a pinned linkage mechanism 146 that is similar to the pinned linkage mechanism 104 that mounts the sector plate 30 to the stabilizer arms 86, 88.

The linkage mechanism 146 comprises a mounting lug 148 shown also in FIG. 16 which has a first end 154 mounted to the surface of the sector plate 30. The mounting lug 148 extends substantially orthogonally from the surface 110 to a distal end portion 156. A pair of linkage plates 150 are disposed on either side of an end portion 152 of the adjuster/actuator rod 144 and the distal end portion 156 of the mounting lug 148. The distal end portion 156 of the mounting lug 148 is pinned to the linkage plates 150 by a first linkage pin 158 shown in FIG. 17 which extends through a first opening 160 in each linkage plate 150 and an opening 162 in the distal end portion of the mounting lug 148. The end portion 152 of the adjuster/actuator rod 144 is pinned to the linkage plates 150 by second linkage pin 164 also shown in FIG. 17 which extends through a second opening 166 in each linkage plate 150 and an opening 168 in the end portion 152 of the adjuster/actuator rod 144. The diameter 163 of the openings 162 in the distal end portion 156 of each mounting lug 148, the diameter 170 of the opening 168 in the end portion 152 of the adjuster/actuator rod 144, and the diameter 172 of the linkage pins 158, 164 are selected such that the linkage pins 158, 164 are free to rotate within the openings 162, 168. The first and second openings 160, 166 in the linkage plates 150 are sized to frictionally engage the linkage pins 158, 164. It should be appreciated that the torsion bar 84 and linkage pins 120, 126 are free to rotate in the openings 92 in the stabilizer lug 76, 78 and the openings 124, 130 in the end portions of the mounting lug 106 and the stabilizer arms 86, 88, respectively, while the adjuster/actuator assembly 142 is used to adjust the position of the sector plate 30.

The plate stabilizer assembly 64 of the present invention reduces the number of adjuster/actuators required for each sector plate 30 or seal plate 34 from three or more to one. Since each adjuster/actuator is expensive to produce and difficult to install or replace, reduction of the number of adjuster/actuators results in a cost savings. Further, air preheater designs were limited by the fact that each sector plate and seal plate required multiple adjuster/actuators to resist the tipping force induced by the travelling pressure loads. Air preheater designs which resulted in sector plates or seal plates which were too small to properly support multiple adjusters/actuators could not be considered. It should be appreciated that a stabilizer assembly in accordance with the invention allows use of sector plates and seal plates which will not properly support multiple adjusters/actuators.

I claim:

1. In a rotary regenerative air preheater including a rotor defining an axis, an external structure surrounding said rotor having a plurality of structure portions, and at least one plate mounted on one of said structure portions between said one structure portion and said rotor, means mounting said plate on said one structure portion comprising:

a stabilizer beam fixedly mountable to said one structure portion, said stabilizer beam having oppositely disposed first and second ends;

first and second stabilizer lugs having oppositely disposed first and second end portions, said first end portion of said first and second stabilizer lugs being mounted adjacent said first and second ends of said stabilizer beam, respectively;

first and second stabilizer arms having oppositely disposed first and second end portions, said first end portion of said first and second stabilizer arms being rotatably mounted to said second end portion of said first and second stabilizer lugs, respectively;

torsion bar means disposed intermediate said first and second stabilizer lugs and fixed thereto for transmitting force between said first and second stabilizer lugs;

first and second mounting lugs having oppositely disposed first and second end portions, said first end portion of each mounting lug being fixedly mountable to said plate; and first and second linkage means for rotatably linking said second end portion of said first and second stabilizer arms in offset relationship to said second end portion of said first and second mounting lugs, respectively.

2. In a rotary regenerative air preheater as recited in claim 1 wherein said torsion bar means comprises oppositely disposed first and second end portions, said second end portion of said first and second stabilizer lugs each comprise an opening, and said first end portion of said first and second stabilizer arms each comprise a first opening, wherein said opening of said first stabilizer lug and said first opening of said first stabilizer arm receive said first end portion of said torsion bar means and said opening of said second stabilizer lug and said first opening of said second stabilizer arm receive said second end portion of said torsion bar means.

3. In a rotary regenerative air preheater as recited in claim 2 wherein said torsion bar means has a diameter and said opening of said first and second stabilizer lugs have a diameter wherein said diameter of said opening of said first and second stabilizer lugs is greater than said diameter of said torsion bar means, whereby said torsion bar means rotates freely within said opening of said first and second stabilizer lugs.

4. In a rotary regenerative air preheater as recited in claim 2 wherein said second end portion of said first and second stabilizer lugs are disposed intermediate said first end portion of said first and second stabilizer arms.

5. In a rotary regenerative air preheater as recited in claim 4 wherein said first end portion of said torsion bar means is fixedly mounted to said first end portion of said first stabilizer arm and said second end portion of said torsion bar means is fixedly mounted to said first end portion of said second stabilizer arm.

6. In a rotary regenerative air preheater as recited in claim 4 wherein said torsion bar means further comprises oppositely disposed first and second ends, said first stabilizer arm has a surface oppositely disposed to said second stabilizer arm, and said second stabilizer arm has a surface oppositely disposed to said first stabilizer arm, wherein said first end of said torsion bar means extends outwardly from said surface of said first stabilizer arm and is mounted thereto and said second end of said torsion bar means extends outwardly from said surface of said second stabilizer arm and is mounted thereto.

7. In a rotary regenerative air preheater as recited in claim 1 wherein said first and second linkage means each further comprise first and second linkage plates, each of said linkage plates having oppositely disposed first and second end portions, wherein said second end portion of one of stabilizer arms is disposed between said first end portions of one of said first and second linkage plates and rotatably mounted thereto and said second end portion of one of mounting lugs is disposed between said second end portions of said first and second linkage plates and rotatably mounted thereto.

8. In a rotary regenerative air preheater as recited in claim 7 wherein each of said linkage means further comprises a first linkage pin and said first end portion of said first and second linkage plates each comprise a first opening and said second end portion of said first and second stabilizer arms each comprises a second opening for receiving said first linkage pin.

9. In a rotary regenerative air preheater as recited in claim 8 wherein said first linkage pin has a diameter and said second opening of said first and second stabilizer arms each have a diameter wherein said diameter of said second opening of said first and second stabilizer arms is greater than said diameter of said first linkage pin, whereby said first linkage pin rotates freely within said second opening of said first and second stabilizer arms.

10. In a rotary regenerative air preheater as recited in claim 9 wherein said first linkage pin is fixedly mounted to said first and second linkage plates.

11. In a rotary regenerative air preheater as recited in claim 8 wherein each of said linkage means further comprises a second linkage pin and said second end portion of said first and second linkage plates each comprise a second opening and said second end portion of said first and second mounting lugs each comprises an opening for receiving said second linkage pin.

12. In a rotary regenerative air preheater as recited in claim 11 wherein said second linkage pin has a diameter and said opening of said first and second mounting lugs each have a diameter wherein said diameter of said opening of said first and second mounting lugs is greater than said diameter of said second linkage pin, whereby said second linkage pin rotates freely within said opening of said first and second mounting lugs.

13. In a rotary regenerative air preheater as recited in claim 1 further including adjustment means for adjusting the position of said plate comprising:

a mounting plate having oppositely disposed first and second end portions, said first end portion of said mounting plate being fixedly mounted to said plate;

rod means having a first end portion and a shaft portion extending from said first end portion of said rod means through said external structure for applying an adjustment force to said mounting plate; and third linkage means for rotatably linking said end portion of said rod means to said mounting plate.

14. In a rotary regenerative air preheater as recited in claim 13 wherein said third linkage means comprises third and fourth linkage plates having oppositely disposed first and second end portions, wherein said end portion of said rod means is disposed between said first end portions of said third and fourth linkage plates and rotatably mounted thereto and said second end portion of said mounting plate is disposed between said second end portions of said third and fourth linkage plates and rotatably mounted thereto.

15. In a rotary regenerative air preheater as recited in claim 14 wherein said third linkage means further comprises third and fourth linkage pins and said first and second end portions of said third and fourth linkage plates each comprise a first and second openings, respectively, said end portion of said rod means comprises an opening, and said second end portion of said mounting plate comprises an opening, wherein said third linkage pin is received in said first opening of said third and fourth linkage plates and said opening of said end portion of said rod means and said fourth linkage pin is received in said second opening of said third and fourth linkage plates and said opening of said second end portion of said mounting plate.

16. In a rotary regenerative air preheater as recited in claim 15 wherein said third linkage pin has a diameter and said opening of said end portion of said rod means has a diameter wherein said diameter of said opening of said end portion of said rod means is greater than said diameter of said third linkage pin, whereby said third linkage pin rotates freely within said opening of said end portion of said rod means.

17. In a rotary regenerative air preheater as recited in claim 16 wherein said fourth linkage pin has a diameter and said opening of said second end portion of said mounting plate has a diameter wherein said diameter of said opening of said second end portion of said mounting plate is greater than said diameter of said fourth linkage pin, whereby said fourth linkage pin rotates freely within said opening of said second end portion of said mounting plate.

18. In a rotary regenerative air preheater including a rotor defining an axis, an external structure having a plurality of structure portions surrounding said rotor, and at least one plate mounted on one of said structure portions between said one structure portion and said rotor, mounting means for mounting said plate on said one structure portion, and adjustment means for adjusting the position of said plate relative to said one structure portion;

said mounting means comprising:

a stabilizer beam fixedly mountable to said one structure portion, said stabilizer beam having oppositely disposed first and second ends;

first and second stabilizer lugs having oppositely disposed first and second end portions, said first end portion of said first and second stabilizer lugs being mounted adjacent said first and second ends of said stabilizer beam, respectively;

first and second stabilizer arms having oppositely disposed first and second end portions, said first end portion of said first and second stabilizer arms being rotatably mounted to said second end portion of said first and second stabilizer lugs, respectively;

torsion bar means disposed intermediate said first and second stabilizer lugs and fixed thereto for transmitting force between said first and second stabilizer lugs;

first and second mounting lugs having oppositely disposed first and second end portions, said first end portion of each mounting lug being fixedly mountable to said plate; and first and second linkage means for rotatably linking said second end portion of said first and second stabilizer arms in offset relationship to said second end portion of said first and second mounting lugs, respectively;

said adjustment means comprising:

a mounting plate having oppositely disposed first and second end portions, said first end portion of said mounting plate being fixedly mounted to said plate;

an adjustment rod comprising a first end portion linked to said mounting plate, a second end portion disposed exteriorly to said external structure, and a shaft portion extending from said first end portion to said second end portion of said adjustment rod; and third linkage means for rotatably linking said first end portion of said adjustment rod to said mounting plate.

\* \* \* \* \*